Jan. 24, 1956     A. G. BODINE, JR     2,731,795
ACOUSTIC PULSE JET ENGINE WITH ACOUSTIC AIR INTAKE SYSTEM
Filed Sept. 1, 1955     5 Sheets—Sheet 1
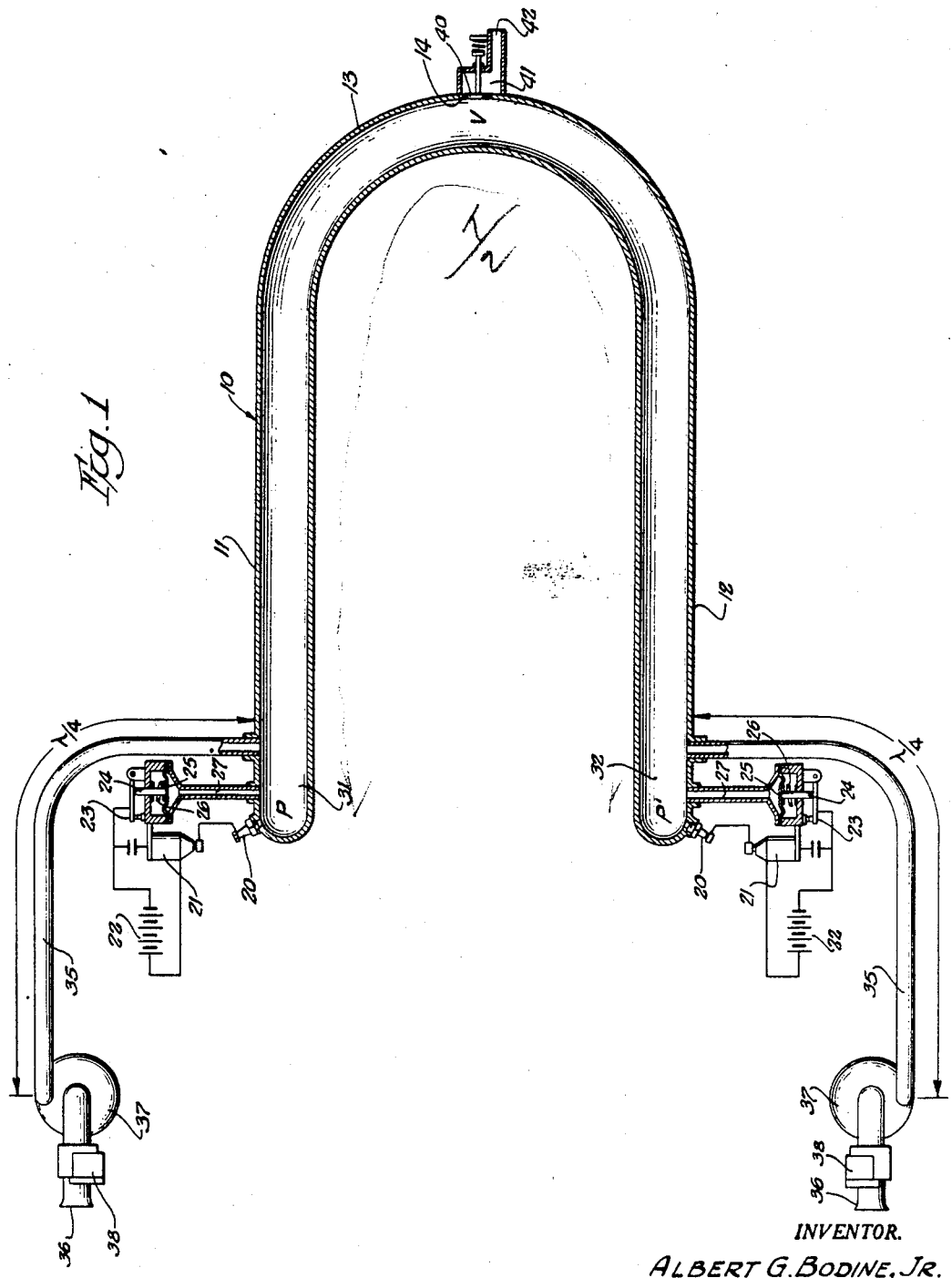
INVENTOR.
ALBERT G. BODINE, JR.
BY
ATTORNEY.

Jan. 24, 1956  A. G. BODINE, JR  2,731,795
ACOUSTIC PULSE JET ENGINE WITH ACOUSTIC AIR INTAKE SYSTEM
Filed Sept. 1, 1955  5 Sheets-Sheet 2
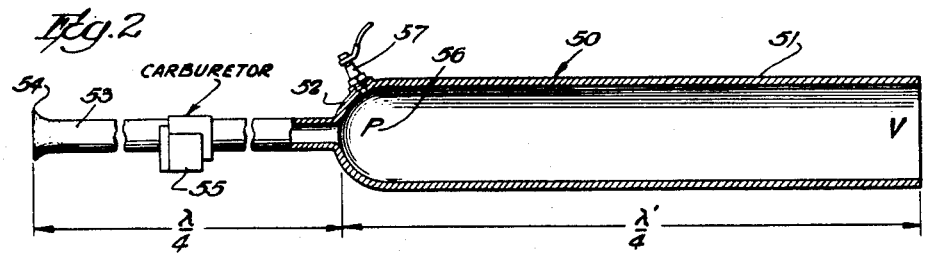
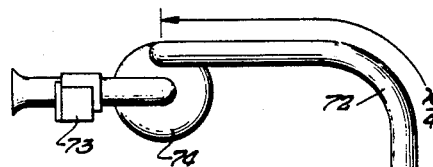
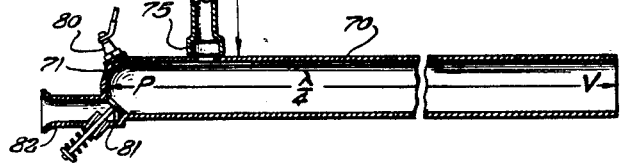
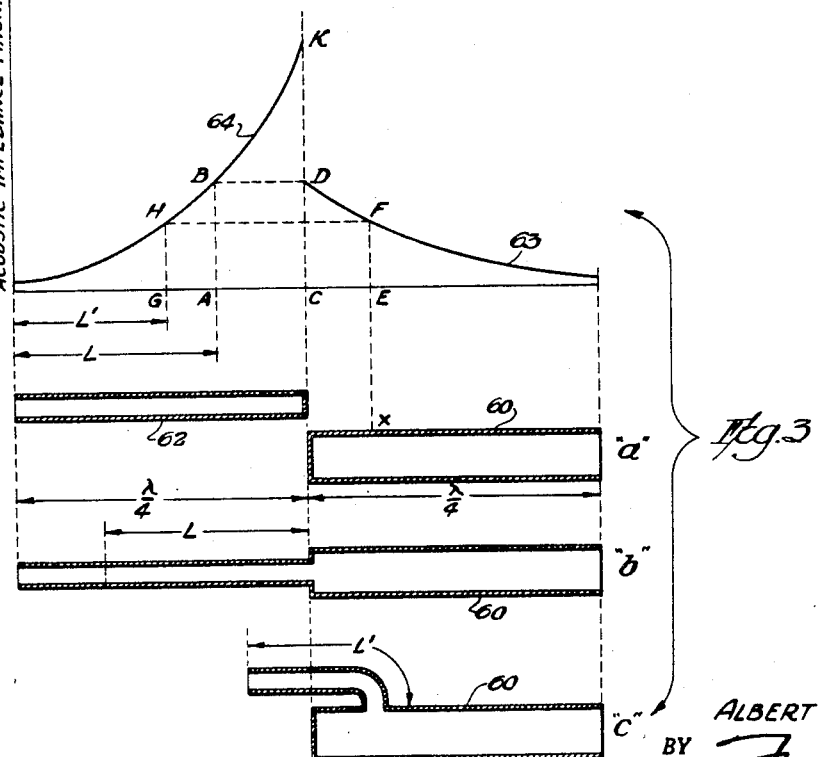
INVENTOR.
ALBERT G. BODINE, JR.
BY
ATTORNEY.

Jan. 24, 1956     A. G. BODINE, JR     2,731,795
ACOUSTIC PULSE JET ENGINE WITH ACOUSTIC AIR INTAKE SYSTEM
Filed Sept. 1, 1955     5 Sheets-Sheet 3
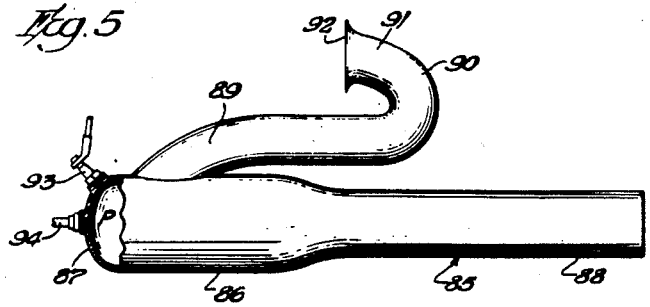
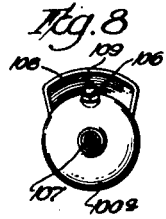 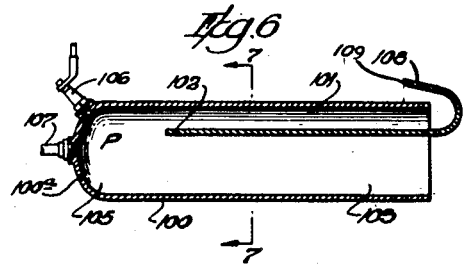 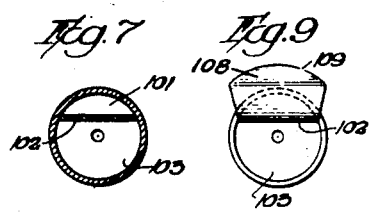 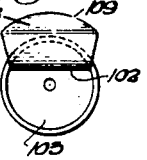
 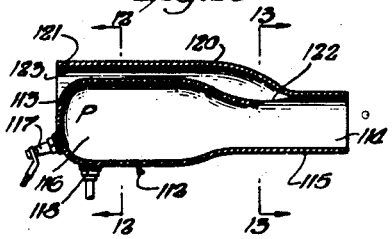 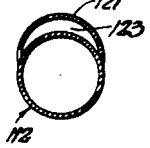 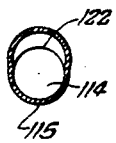 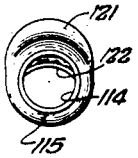
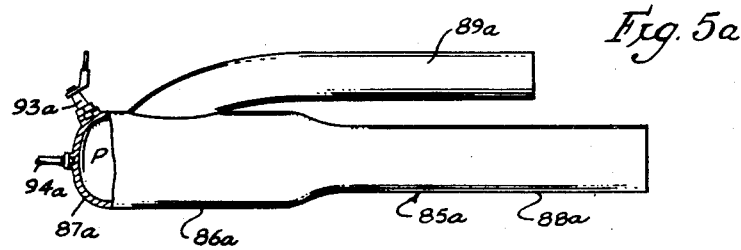
INVENTOR.
ALBERT G. BODINE, JR.
BY
ATTORNEY.

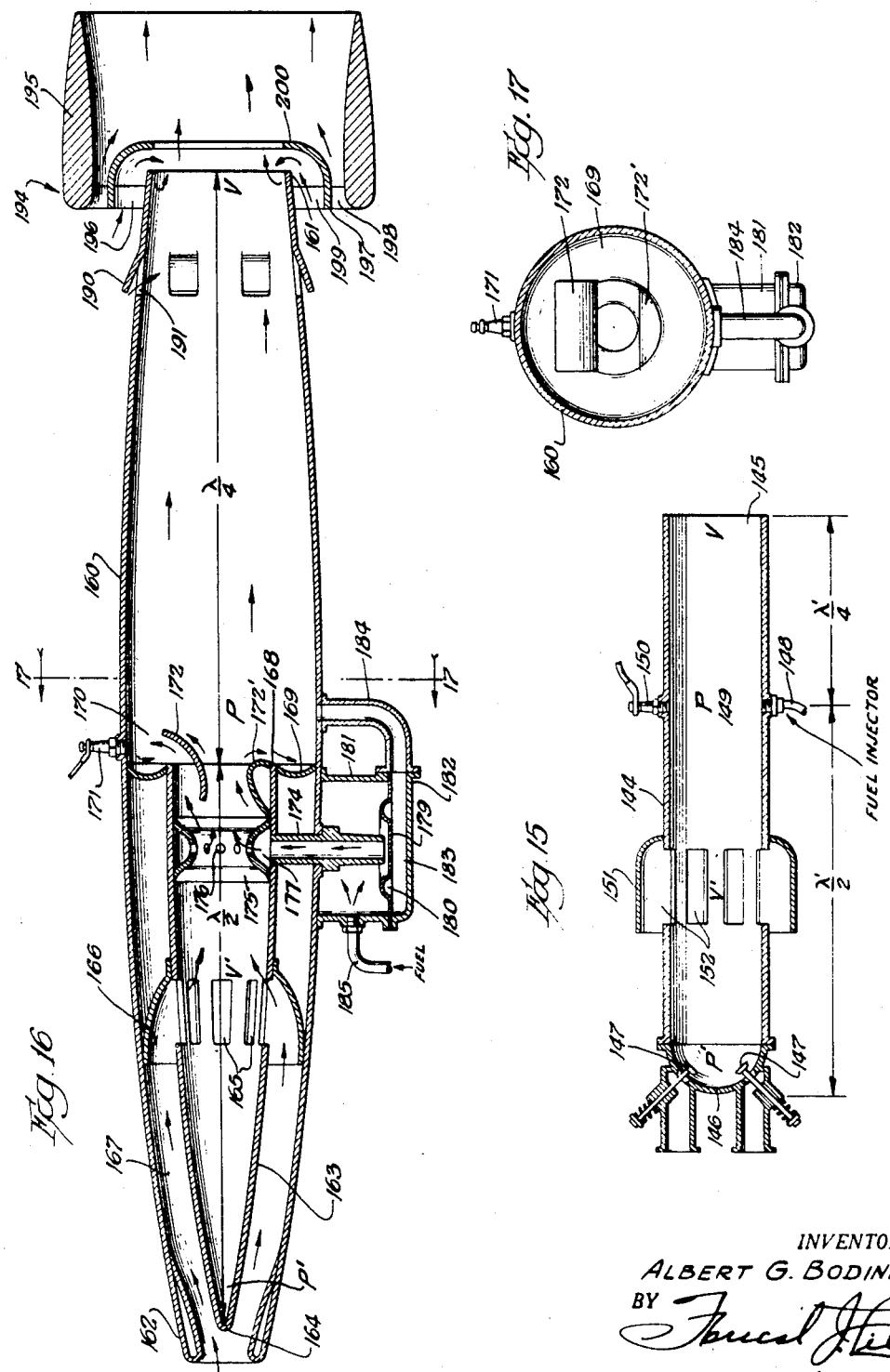

Jan. 24, 1956  A. G. BODINE, JR  2,731,795
ACOUSTIC PULSE JET ENGINE WITH ACOUSTIC AIR INTAKE SYSTEM
Filed Sept. 1, 1955  5 Sheets-Sheet 5
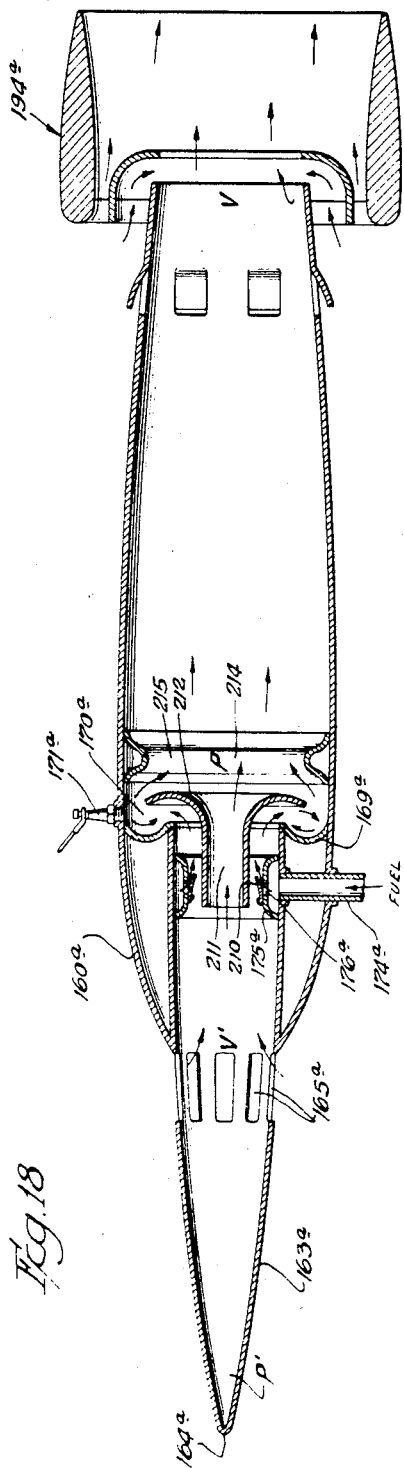
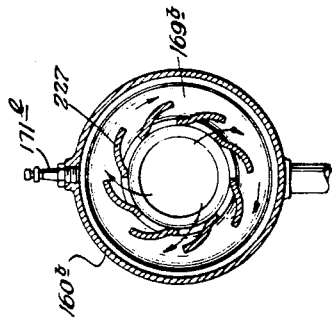
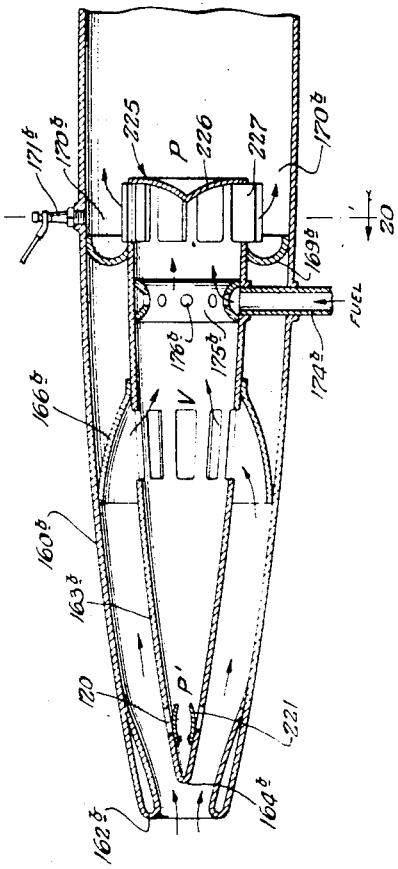
INVENTOR.
ALBERT G. BODINE, JR.
BY
ATTORNEY United States Patent Office 2,731,795
Patented Jan. 24, 1956

2,731,795
ACOUSTIC PULSE JET ENGINE WITH ACOUSTIC AIR INTAKE SYSTEM

Albert G. Bodine, Jr., Van Nuys, Calif.

Application September 1, 1955, Serial No. 532,017

18 Claims. (Cl. 60—39.77)

This invention relates generally to acoustically resonant pulse jet heat engines, i. e., those in which the events of the operating cycle are controlled by acoustic resonance phenomena, and more particularly to the air feeding system for such engines.

The present application is a continuation-in-part of my earlier applications as follows: Method and Apparatus for Generating a Controlled Thrust, Ser. No. 439,926, filed April 21, 1942 (parent application, now abandoned); Jet Propulsion Apparatus, Ser. No. 728,766, filed February 15, 1947, and allowed May 18, 1955 (now abandoned), which was a continuation-in-part of my original application application Ser. No. 439,926; and Pulse Jet Engine with Acoustic Air Intake Pipe, Ser. No. 330,455, filed January 9, 1953 (now abandoned), which was connected by copendency with Ser. No. 439,926 through Ser. No. 728,766.

The nature of an illustrative pulse jet heat engine to which the present invention is broadly applicable, as well as an embodiment of the present invention, were set forth and originally claimed in my said parent application Ser. No. 439,926, and reference is also made to my Patent No. 2,480,626, which was a continuation-in-part of Ser. No. 439,926, and which also disclosed the present invention.

The characteristic of the basic engine to which the present invention is broadly applicable is a resonant acoustic cavity through which a fluid stream passes, and in which is a combustion chamber region wherein fuel is periodically burned at a resonant frequency of the cavity to establish and maintain periodic gas pressure and flow velocity oscillations at the resonant frequency. In general, the resonant acoustic cavity possesses at least one region wherein the gas pressure oscillations are maximized and flow velocity oscillations are minimized, and another region at which these conditions are reversed. The combustion chamber is located at the first of these regions, for an important reason to be mentioned hereinafter. This resonant acoustic cavity may taken various physical forms and have various acoustical properties in addition to those mentioned. For the purpose of simple illustration in the immediately ensuing discussion, there will, however, be assumed the elementary case of a cavity in the form of a simple pipe, effectively closed at one end and open for gas discharge at the other, in which a quarter wavelength acoustic standing wave may be set up in accordance with fundamental organ pipe theory.

Pressure and velocity anti-nodes are characteristic of acoustic standing waves, and refer, respectively, to regions of maximum pressure and velocity variation. At a pressure anti-node, the pressure swings first positively and then negatively, i. e., above and below some established mean pressure, and gas particle oscillation is minimized (ideally, reduced to zero). At a velocity anti-node, the gas particles periodically reverse direction at maximum velocity amplitude, and pressure variations are minimized (ideally, reduced to zero). The standing wave in a quarter wave pipe has a pressure anti-node adjacent its closed end, and a velocity anti-node at its open end.

For best analysis of the system, the concepts of acoustic impedance are employed. The "characteristic" acoustic impedance at a point in a sound field is defined as the ratio of sound wave pressure $p$ to oscillating gas particle velocity $v$, and it will be seen that the characteristic acoustic impedance is high at a pressure anti-node, and low at a velocity antinode. I have found that a resonant acoustic system of this type can most effectively be excited or driven by a periodic pressure source located at a region of high impedance. Accordingly, for the quarter-wave pipe case assumed, I locate the combustion chamber, i. e., the region where the fuel is to be periodically burned, at the high impedance pressure anti-node zone within the head end region of the quarter wavelength pipe (sometimes hereinafter referred to as the burner pipe).

In absence of the acoustic air feeding system of the present invention, air for combustion is introduced into the combustion chamber region of the burner pipe through mechanical valves located at its closed or head end. Such mechanical valves, however, are a serious source of trouble and are an impediment to good design and efficient operation. Their life is short, owing to burning and wear. They limit flow capacity by their occupancy of a substantial cross-sectional area of the gas column. They cause turbulence and energy loss in the airflow, cause intermittent reduction of airflow through the apparatus, interfere with the good diffuser action; and particularly because of their pressure response, they furnish a limitation on the intensity of the standing wave which can be built up in the system.

It is accordingly a primary object of the present invention to eliminate such mechanical valves in favor of a continuously open or valveless air intake passage.

It can be seen at once that a mere orifice, or a short air intake pipe, introduced into the high impedance region comprising the head or closed end of the burner pipe, will not serve as a suitable replacement for a mechanical valve, since such a port or short pipe, communicating directly with outside atmosphere, will exhaust a large quantity of gas upon each explosion in the combustion chamber, thus flattening the positive pressure half cycle; and will cause inflow of air in response to any remaining tendency to build up a succeeding negative pressure half cycle, thus further flattening the negative pressure half cycle, so that development of the necessary high amplitude pressure swing at the desired location of the pressure anti-node region of the standing wave is prevented. In other language, such a port or short pipe, communicating directly with outside atmosphere, imposes a condition of low impedance at the point of air intake into the combustion chamber, preventing development of a high impedance pressure anti-node condition in this combustion chamber region.

I have discovered, however, that by employment of an air intake pipe or passage of properly selected impedance characteristics, the pressure pulses created near the junction and within the combustion chamber by the periodic combustion may be balanced or bucked by equal pressure pulses within the adjoining end of the air intake pipe, so that air does not flow through the intake pipe in response to the pressure cycle in the combustion chamber, as it does with a valve, or a simple port or short pipe. Thus an explosion occurring within the adjoining region of combustion chamber creates a high positive pressure pulse, followed by a corresponding negative pulse; and these are bucked by equal and opposed positive and then negative pressure pulses created within the adjoining end of the air intake pipe by the acoustic characteristics of the latter. Hence, no combustion gas blows out the air intake pipe on the positive pressure pulse, and no intake air is sucked in through the air intake pipe as a result of the negative pressure pulse. It must be understood, of course, that air flows continuously into the system through the air intake pipe, which may be accomplished, for instance, through use of a blower, or by forward velocity of the engine through the atmosphere. Thus when I speak of prevention of air or gas flow through the air intake pipe, I refer only to the oscillating component of gas flow owing to the positive and negative pressure excursions of the standing wave at the combustion chamber. In other words, such an acoustic air intake pipe tends to give the same result, so far as the pressure oscillation cycle in the combustion chamber is concerned, as a solid wall.

I have found that an air intake pipe a quarter-wavelength long for the frequency of the standing wave in the burner pipe has a quarter wavelength standing wave set up therein in sympathy with that established in the burner pipe. Such standing wave has a low impedance velocity anti-node region at the intake port of the pipe, and a high impedance pressure anti-node region at its juncture with the burner pipe, the latter providing the necessary equalizing pressure pulses for the pressure pulses in the adjoining region of the combustion chamber of the burner pipe.

I have also found that the length of the acoustic air intake pipe may also be somewhat longer or shorter than a quarter wavelength, and still present the necessary equalizing pressure pulses at its juncture with the combustion pipe. For best explanation of this permissible departure from quarter wavelength, recourse is had to the concept of "analogous" acoustic impedance, differing from the earlier defined "characteristic" acoustic impedance by appearance of the factor S (cross sectional area of the pipe) in the denominator. Thus the "analogous" acoustic impedance magnitude $|Z_a|$, now usually referred to simply as "acoustic impedance," is the ratio of sound wave pressure $p$ to the product of $v$ (oscillating gas particle velocity amplitude) and S. Thus $$|Z_a| = \frac{p}{vS}$$

Now, at any and all of an infinite choice of arbitrarily selected cross-sectional planes in the fluid duct through the system, from the air intake port at the forward extremity back through the system to the final gas discharge outlet at the tail, it will be found that during operation the analogous acoustic impedances (or simply acoustic impedances) looking upstream and downstream are matched. This law is one of broad application, and refers not only to the preliminarily instanced case of an actual air intake pipe joined to a quarter wave burner pipe, but also to other physical and acoustical configurations wherein separate air intake and burner pipe components cannot be readily identified, though the acoustically essential high and low impedance regions are present in the duct. Still confining attention primarily to the illustrative example, however, the air intake pipe is generally, if not necessarily, of materially lesser cross-sectional area than the burner pipe, and the above stated rule with regard to impedance match looking upstream and downstream of the duct holds for the plane at the corresponding enlarging offset in the duct. At short distances upstream and downstream from the plane of such enlarging offset, the pressure pulses $p_1$ and $p_2$ are equal, and the product $v_1 S_1$ (upstream gas particle velocity times area) is equal to the product $v_2 S_2$ (downstream gas particle velocity times area). This follows from fundamental laws requiring a continuity of both pressure and mass flow across any given cross-sectional plane of the duct. Of course, at the pressure anti-node, particle velocity is theoretically zero, and the impedance infinite. This idealized state, however, is not realized in a practical apparatus, and $v_1$ and $v_2$ adjust themselves relative to $S_1$ and $S_2$ such that $v_1 S_1 = v_2 S_2$. It will be seen that the acoustic impedances will be equalized on opposite sides of the plane in question, in order to satisfy continuity of pressure and mass flow across the plane, as explained above. However, if the intake pipe is too short, the necessary high impedance condition cannot be attained in the combustion chamber at the junction; the factors $v_1$ and $v_2$ increase, and the pressure swing at the pressure anti-node is diminished. The standing wave is thereby so weakened that the system will fail to function because substantial pressure cycles do not exist in the flame.

Sufficiently high values of acoustic impedance for the air intake pipe, however, meet the problem. Resort is here had to a consideration of the analogous acoustic impedances of the air intake pipe or passage, and of the burner pipe, considered separately of one another. It is known to those skilled in the acoustics art that the analogous impedance for a given point along a given pipe may be either measured or calculated for any assigned frequency. Knowing the inherent relatively high magnitude of the analogous acoustic impedance for the head end or pressure anti-node region of the burner pipe considered by itself, i. e., calculated on the basis of a closed head end, I then design the air intake pipe to have an analogous acoustic impedance at the point where it is to be joined to the burner pipe which is at least of that same magnitude—the resonant frequency of the burner pipe and the difference in temperature of the air in the intake pipe and the combustion gases in the burner pipe being taken into account. If the air intake pipe does not join the main burner pipe precisely at the point of maximum acoustic impedance of the latter, it is sufficient if it be designed to be at least of the same magnitude as the acoustic impedance of the main burner pipe at the junction. When this has been done, the acoustic impedances on both sides of the plane of juncture will not only be of the same magnitude, but the acoustic impedances on both sides of the junction will be as high as though no opening had been made into the desired pressure anti-node region of the burner pipe.

I have thus provided a system in which combustion is carried out in a predetermined high impedance region of the system, and have at the same time made an opening into this high impedance region through which air may be continuously introduced without lowering the impedance. It will be seen that I have accomplished my objective by employing a valveless, or continuously open, air intake pipe or passage, which presents at its point of communication with the high impedance combustion chamber region of the burner pipe, an acoustic impedance which is as high as the desired or original high acoustic impedance within the burner pipe at the point of juncture for the resonant operating frequency of the burner pipe. It will be further seen that this broad requirement is inherently met in the case of an air intake pipe of quarter wavelength, also with various shorter or longer pipes, depending upon the various factors including the point of juncture and the cross-sectional area of the air supply pipe or passage relative to the burner pipe, and is met also in cases of air intake pipes correlated with important sub or overtone frequency components instead of the fundamental of the burner pipe.

Attention is further directed to the fact that the acoustic impedance, while high at the combustion chamber region of the gas duct, progressively decreases to a low value, substantially zero, at the point of air intake into the system, and also at the point of combustion gas discharge from the system.

It has been mentioned hereinabove that the invention may be practiced in certain physical configurations of apparatus in which separate air intake and burner pipe components are not readily identified, but in which the essential acoustic characteristics are provided. It is accordingly important to recognize that the invention may be broadly characterized as comprising an acoustically resonant gas duct system having a combustion chamber at a high impedance region thereof, and having low impedance points of initial air intake and combustion gas discharge. More specifically, but still stated from the acoustic standpoint, there is provided a gas duct system embodying a resonant acoustic cavity having a high impedance region. Means for carrying out periodic fuel combustion at a resonant frequency of the cavity is located within the cavity at this high impedance region. Gas pressure and flow velocity oscillations take place in the duct at cavity resonance frequency as a consequence of this periodic fuel combustion, and a frequency component of interest of such oscillations has not only a high impedance point at the combustion chamber, but a low impedance point at some location in the duct spaced upstream from the high impedance point. An air intake port for the duct is then located at this low impedance point. In this connection, it is to be recognized that the resonance phenomena occurring within the system may have not only a fundamental frequency component, but an important sub or overtone component. The invention is accordingly characterized by provision of a point of initial air intake at a low impedance region for the component of interest, or of primary importance, whether it be fundamental, or sub or over-tone.

The invention may be embodied in various physical forms, some illustrative embodiments being illustrated in the accompanying drawings, in which:

Figure 1 is a longitudinal section, partly in elevation of an embodiment of my invention;

Figure 2 is a view similar to Figure 1, but showing a modification;

Figure 3 is a diagram showing certain acoustic impedance relationships characteristic of certain aspects of the invention;

Figure 4 is a longitudinal sectional view, partly in elevation, of another embodiment of the invention;

Figure 5 is a longitudanal sectional view of another embodiment of the invention;

Fig. 5a shows a modification of the engine of Fig. 5;

Figure 6 is a longitudinal sectional view of a further embodiment of the invention;

Figure 7 is a section taken on line 7—7 of Figure 6;

Figure 8 is a front end elevational view of the embodiment of Figure 6;

Figure 9 is a rear end elevational view of the embodiment of Figure 6;

Figure 10 is a longitudinal sectional view of still another embodiment of the invention;

Figure 11 is a front elevational view of the embodiment of Figure 10;

Figure 12 is a section taken on line 12—12 of Figure 10;

Figure 13 is a sectional view taken on line 13—13 of Figure 10;

Figure 14 is a rear end elevational view of the embodiment of Figure 10;

Figure 15 is a longitudinal sectional view of a modified form of the invention;

Figure 16 is a longitudinal view of another embodiment of the invention;

Figure 17 is a transverse section taken on line 17—17 of Figure 16;

Figure 18 is a longitudinal sectional view of another embodiment of the invention;

Figure 19 is a longitudinal sectional view of the forward portion of another embodiment of the invention;

Figure 20 is a transverse section taken on line 20—20 of Figure 19.

In Fig. 1 of the drawings, numeral 10 designates generally a U-shaped fluid housing providing a sonic column means or sonic burner pipe, comprising parallel legs 11 and 12 connected by curved pipe section 13. The pipe 10 has at its midpoint a fluid discharge port 14 through which combustion gases are continuously discharged at constant pressure in the later described operation of the system. This pipe 10, acoustically regarded, affords not only a gas conduit or duct, but a resonant acoustic cavity or guide for an acoustic wave pattern, as set forth hereinafter.

The two legs 11 and 12 are closed at their head ends, which are equipped with spark plugs 20. It is found in the operation of this type of apparatus that once operation has been started through use of electric ignition, the system will thereafter be automatically self-igniting in sustained operation by virtue of a "tail-flame" which lingers throughout the cycle. The ignition system can thus, if desired, be cut off once operation has been initiated. However, for starting purposes, and for positively controlled continued running, if such should be desired under any circumstances, I have illustratively shown an ignition system automatically timed by the resonant standing wave set up in the conduit 10. Thus, as here shown, each spark plug 20 is connected to the high voltage terminal of a conventional induction coil 21, the low voltage circuit of this coil including a source of voltage 22 and a make-and-break switch 23 similar to that employed in conventional automotive practice. The switch 23 is actuated by a plunger 24 connected to a diaphragm 25 urged inward by a spring 26, the inner side of the diaphragm communicating through passage 27 with the fluid column in the end portion of the burner pipe. Upon the appearance of a positive pressure pulse at the end portion of the fluid column, the diaphragm 25 moves outward to open switch 23 and break the low voltage circuit, thus inducing in the high tension winding voltage sufficient to cause a spark in plug 20. Thus, at each end of the sonic burner pipe 10, a spark is generated upon each appearance of a positive pressure pulse.

Air is supplied to each of the two ends of the pipe 10 by means of an air induction pipe 35 communicating with the interior of pipe 10 at a point in the general region of the combustion chamber which is defined by the closed end portion of the pipe. For identification purposes, the combustion chambers at the ends of the pipe legs 11 and 12 are designated by reference numerals 31 and 32, respectively.

As here shown, air enters the system through forwardly facing air scoops 36 on the forward ends of induction pipes 35 and its pressure may be increased by means of optional superchargers 37. While fuel can be introduced in various ways, I have here shown the use of carburetors 38 feeding into the air induction pipes. Fuel and air mixture thus enters the two combustion chambers 31 and 32 through the air induction pipes 35.

The sonic burner pipe 10 is one-half wavelength in length for its resonant operating frequency, and each half of the pipe, from the combustion chamber to the fluid outlet 14, is therefore one-quarter wavelength for the resonant operating frequency, i. e., the pipe 10 resonates at a frequency corresponding to a wavelength equal to twice the length of the pipe, or four times the length of either leg from the head end thereof to the discharge port 14. The air induction pipes 35 are one-quarter wavelength for the fundamental or a harmonic of the resonant operating pattern of pipe 10. Because the velocity of sound in the gaseous column within the pipe 10 is increased by the heat of combustion, a quarter wavelength for the cold air induction pipe 35 is necessarily shorter than a quarter wavelength measured along the pipe 10. Accordingly, when I refer to a quarter wavelength for either a half-length of the sonic combustion pipe 10 or the air induction pipes 35, I refer to the operating condition, with cold air in pipes 35, and heated gases in the pipe 10, making a quarter wavelength of a given frequency component for the former case somewhat shorter than for the latter.

In the illustrated embodiment, the gas discharge port 14 is furnished with a spring-loaded back pressure valve 40, constructed as shown diagrammatically in the drawings, the combustion gases being discharged beyond port 14 through chamber 41 and final jet orifice 42. Upon development of pressure within the pipe 10 above atmospheric, this valve 14 opens and stands open to permit gas discharge via orifice 42, holding, however, an elevated mean static pressure within the pipe 10.

Operation is as follows: assuming the apparatus to have an initial forward velocity, or air to be blown in through induction pipes 35, as by means of superchargers 37, the pipes deliver a continuous flow of fuel mixture to combustion chambers 31 and 32. Assume now that the spark plug at the head end of leg 11 is sparked, exploding the fuel mixture. This explosion creates a positive pressure pulse or condensation wave which travels with the speed of sound in the gas column contained in pipe 10. This pressure pulse initiated at combustion chamber 31 travels around the pipe 10 to the combustion chamber 32 at its opposite end, compressing and increasing the density of the fuel charge which has previously been introduced to the chamber 32 via the induction pipe 35. The pressure pulse having arrived at the far end of leg 12, is reflected by the closed end of said leg, and retraverses the gas column toward the original combustion chamber 31. The positive pressure pulse, upon arrival at combustion chamber 32, however, acts upon the ignition timing system described above to cause a spark to occur at plug 20, and the compressed fuel and air mixture standing in chamber 32 is exploded. The pressure rise owing to the new explosion is added to the positive pressure pulse just arrived at the chamber 32, so that the reflected pressure pulse or wave of condensation retraversing the pipe 10 is of reinforced amplitude. This positive pressure pulse of reinforced amplitude then arrives at combustion chamber 31, compressing and increasing the density of the new fuel mixture charge introduced by the pipe 35 to the combustion chamber space 31 since the preceding explosion, and explosion of this compressed charge (ignited either by electric or tail flame ignition) occurs substantially coincidently with the arrival of the positive pressure pulse, thereby further peaking the positive pressure pulse, when the cycle is repeated. The positive pressure peak created in each combustion chamber by such explosion is followed, a half cycle later, by a pressure depression, i. e., a negative pressure pulse or pulse of rarefaction, which traverses the gas column from end to end following the condensation wave by 180°.

The interaction of these travelling waves of compression and rarefaction establishes a sonic standing wave in the gas column, with a pressure anti-node P at the head end of leg 11, another pressure anti-node P' at the head end of leg 12, and a velocity anti-node V at the mid-point of the tube, immediately opposite discharge port 14. As stated earlier, the pressure anti-node regions are regions of maximum pressure swing between positive and negative peak values. It will be observed that the combustion chambers 31 and 32 coincide with the pressure anti-node regions P and P', respectively. It has earlier been explained that a pressure anti-node in a sound field is a region of high acoustic impedance, and the location of the combustion chambers at these high impedance regions is of importance, in that maximum energy extraction from the flame for excitation of the standing wave is thereby attained.

The velocity anti-node region at V is a region of maximum gas oscillation, but is also a region of constant pressure, since a positive pressure pulse from each chamber is always met, at the V region, by a cancelling negative pulse from the opposite chamber. Since this condition of constant pressure exists in front of the discharge valve 40, and since there is a substantially constant external pressure condition outside the discharge orifice, the valve 40 is subjected to a constant pressure differential during operation, and therefore stands open for discharge of gases. Its spring loading, however, results in holding a certain back pressure at the discharge outlet, so that the system operates at a correspondingly elevated internal mean pressure. The spring loaded "valve," in ultimate effect, provides a discharge orifice automatically variable to maintain a back pressure on the system regardless of power level and consequent average fluid flow. The valve 40 opens to an equilibrium position when the engine is started and a pressure is maintained in the region V sufficient to move the valve back against its spring. Thereafter, the valve automatically takes and holds an open position governed by the setting of the throttle that controls the fuel feed.

It should now be understood that at each pressure anti-node P and P', a large pressure swing takes place, and that if a simple valveless air inlet port were to be opened into the combustion chambers, such pressure swing could not be maintained, since on the positive half cycle, fluid leakage would take place out the port, and so reduce the pressure rise, and on the negative half cycle, air would be sucked in, and so reduce the pressure depression. The air intake pipe of the present invention, however, feeds air continuously into the combustion chamber without dissipation of the high pressure swing at the pressure anti-node.

As stated earlier, if the air intake pipe has a length of substantially one-quarter wavelength for the resonant frequency pattern of the sonic pipe 10, it will be tuned to resonance with the pipe 10, and will prevent dissipation of the standing wave at the pressure anti-node. It may then have a quarter wavelength standing wave of its own, having a velocity anti-node at its mouth, and a pressure anti-node at its junction, with the pipe 10 joining with the pressure anti-node P, or P', as the case may be. Pressure swings in the regions P and P' are neutralized or bucked by like pressure swings in the adjacent ends of the corresponding induction pipes. It follows that each explosion-generated pressure rise in the combustion chamber is not accompanied by a strong outrush of air through the induction pipe, but rather is bucked by an equal pressure rise in the adjoining end of the induction pipe. Nor is each pressure depression followed by a corresponding inrush of air through the induction pipe, but rather is matched by a similar reduction in pressure in the adjoining end of the induction pipe.

Standing waves in the quarter wavelength induction pipes can be analyzed by considering that each positive pressure pulse occurring at a combustion chamber will send a wave of condensation out along the air column in the air induction pipe. This wave of condensation is reflected by the end of the quarter-wave pipe as a wave of rarefaction, i. e., a negative pressure pulse, which returns in the forward direction to reach the combustion chamber in step with occurrence at that point of a negative pressure peak. The negative pressure condition in the chamber then causes a negative pressure pulse to return along the air column in the induction pipe, which pulse is reflected by the forward end of the induction pipe as a positive pulse arriving at the combustion chamber in step with occurrence of the next positive pressure peak in the latter. Thus there is no unbalanced pressure condition capable of causing either blowing or sucking of air out of or into the combustion chamber via the air induction pipe.

It must be understood that there is, however, a continuous "direct current" flow of air through the induction pipes, the two legs of the U-tube, and the fluid outlet, this continuous air flow component resulting from supercharger pressure and/or forward velocity of the engine through the atmosphere. Jet propulsion results from intake and jet discharge of this air. Superimposed on this component or "core" of continuous flow air is the oscillating flow characteristic of the acoustic standing wave.

The acoustic valveless air intake pipes 35 may also be analyzed, in a somewhat broader or generic aspect, by taking cognizance of the concepts of acoustic impedance, as set forth in the introductory portion of this specification, and as hereinafter further developed in connection with the diagram of Fig 3. Such discussion will be deferred, however, until one further simple illustrative embodiment of the invention has been described.

Referring next to Fig. 2, numeral 50 designates generally a resonant housing or cavity providing a fluid conduit and wave guide. This housing or cavity is made up of a burner and discharge section, in this instance a straight cylindrical pipe 51 open at one end with a wave reflection head or closure 52 at the other, and an air intake section, in this instance a straight pipe 53, of substantially lesser diameter than pipe 51, joined axially to pipe 51 by means of an inlet opening formed in head 52. Pipe 53 has a forwardly facing air scoop 54 at its intake port end, and may have joined to it a carburetor 55 for introduction of fuel to the air stream passing through it. The pipes 51 and 53 need not, however, be either straight or of uniform cross section throughout.

Numeral 56 indicates generally the combustion chamber region in pipe 51, adjacent to head 52, and 57 designates a spark plug mounted in the closed end portion of pipe 51 initiating fuel combustion.

Operation is as follows: assuming the apparatus to have an initial forward velocity, or air to be blown into scoop 54, or a supercharger to be used in conjunction with pipe 53 (as in the embodiment of Fig. 1) air intake pipe 53 delivers a continuous flow of fuel mixture to combustion chamber 56. This mixture is ignited, at the outset, by spark plug 57, and the pressure rise produced by the resulting explosion sends a positive pressure pulse or condensation wave traveling with the speed of sound in the column of combustion gases toward the rearward open end of the pipe 51. This wave is reflected from the open end of the pipe as a negative wave or wave of rarefaction, which, upon reaching head 52, is in turn reflected by the latter as a wave of rarefaction traveling back toward the open end. Upon reaching the open end of the pipe, the rearwardly traveling wave of rarefaction is reflected as a wave of condensation. This wave of condensation travels upstream toward head 52, and, arriving at the combustion chamber 56, increases the pressure thereat, so that the fuel mixture introduced by the pipe 53 subsequent to the preceding explosion has its density sufficiently increased to cause a second explosion. The flame never completely extinguishes between explosions, but the reduced pressure and fuel-air mixture density conditions prevailing between positive pressure peaks inhibit and attenuate combustion to a point that only sufficient flame is retained to assure explosive combustion on subsequent pressure peaks.

Thus as each positive pressure pulse launched down the pipe 51 from the combustion chamber finally returns as a reflected positive pressure pulse, a new explosion automatically occurs to reenforce the returned pulse and to launch a succeeding amplified positive pressure pulse. In short, the pipe 51 behaves in accordance with quarter-wave organ pipe theory, cyclically excited at its resonant frequency. In accordance with such theory, a quarter wavelength standing wave is established in the pipe 51, with a pressure anti-node P adjacent the head 52, and a velocity anti-node V at the open end or tail.

As earlier explained, the pressure anti-node region P is a region of high acoustic impedance. It is found in the operation of the engine that the combustion flame tends to reside in the region adjacent to the internal shoulder provided by the end wall 52, and, to assure maximum extraction energy from this flame, it is an important feature of the engine that the acoustic impedance is in this region.

At the pressure anti-node zone P, alternate positive and negative pressure peaks are experienced, and, since this region P is also the location of a velocity node, to-and-fro oscillation of the gas particles at zone P is minimized (ideally, zero). At the velocity anti-node region V, the gas moves to-and-fro into and out of the open end of pipe 51 with substantial velocity amplitude. Outside air is thereby alternatively drawn into the end of the pipe from virtually all directions and expelled with definite direction and increased momentum along with combustion gases. As described in connection with the embodiment of Fig. 1, there is in addition a substantial continuous "direct current" flow of air through the air intake pipe 53, the combustion chamber 56 and the pipe 51, this flow resulting from air blown through the air intake pipe, either by ram pressure owing to forward velocity of the apparatus through the atmosphere, or by use of a supercharger such as shown in connection with Fig. 1. At the combustion chamber pressure anti-node region P, therefore, there is a necessary gas flow component in the rearward direction. At the velocity anti-node region V, the oscillating gas flow owing to the standing wave is superimposed on this "direct current" continuous flow of gases, and it will be appreciated that the oscillating component of gas flow gradually diminishes to a minimum, ideally to zero velocity, toward the pressure anti-node region P.

With regard to the operating frequency, pipe 10 resonates automatically at a frequency corresponding, for the velocity of sound in the heated gases in the pipe 51, to a wavelength equal to four times the length of pipe 51. It will be seen that the periodic combustion which creates and maintains the resonant standing wave is timed and controlled by that same standing wave.

In accordance with the invention, the air intake pipe 53 is given acoustic characteristics such as will buck or neutralize the succeeding positive and then negative pressure half cycles within the pressure anti-node region P of the pipe 51. This may be accomplished, as in the case of Fig. 1, by tuning the air intake pipe 53 to the resonant frequency of the pipe 51, as by giving it a length substantially equal to a quarter wavelength for the resonant frequency of the tube 51. Pipes 51 and 53 are in such case both quarter wave pipes for the same resonant operating frequency, though pipe 51 will be considerably longer than pipe 53 because of the difference in velocity of sound in the heated and unheated gases traversing them. In one sense it can be said that the complete system comprises a substantially "half-wave" engine, because of the inclusion of a "quarter wave" intake. Thus, there is in the gas column within pipe 53 a quarter wavelength standing wave, with a pressure anti-node region adjacent its juncture with the pipe 51, and a velocity anti-node region at its air intake port at the forward extremity. At the pressure anti-node region, alternating positive and negative pressure half cycles are set up in sympathy with the corresponding positive and negative half cycles occurring at the region P of pipe 51, and the positive and then negative pressure half cycles on opposite sides of the plane of junction are equal, so that no gas flow occurs across said plane in response to the pressure cycle at P. At the ingoing end of the pipe 53, of course, where a velocity anti-node exists, there will be an oscillating component of gas flow, though this does not enter into the operation of the system and may be ignored. This quarter wavelength standing wave in the air intake pipe does not interfere with the continuous flow of gas through pipe 53 established by ram pressure, or by blower action, as earlier described.

The system consisting of pipes 51 and 53 may be regarded as a unitary resonant system with a single standing wave system therein, there being a pressure anti-node between the open ends of the pipes, a velocity anti-node at the open discharge end of pipe 51, and a velocity anti-node at the open mouth of pipe 53. I generally prefer, however, to regard this particular system as divided into two sections, with a quarter wavelength standing wave in each, the pressure anti-nodes of the two standing waves occurring adjacent and in phase with one another at the junction so that positive and negative pressure pulses of the two waves here oppose and balance one another. It can be readily seen that such balance of pressure pulses having been established, no gas flow will occur between the pipes owing to the pressure cycle, and there is hence no material oscillating component of gas flow from either pipe into the other during the operating cycle. Again, as heretofore explained, the standing wave system does not interfere whatsoever with free continuous flow of gas through the series connected pipes 53 and 51, such flow being governed only by the pressure differential between the mouth of the air intake pipe 53 and the open tail of the burner pipe 51.

The engines of Figs. 1 and 2 have now been described as having quarter wavelength air intake pipes. As set forth in the introductory part of this specification, a broader and more general analysis results when the acoustic phenomena involved in the invention are considered from the standpoint of acoustic impedance, and it was there demonstrated that a quarter wavelength air intake pipe or passage, more generally considered for the purpose of the present invention, is one case of an air intake pipe characterized by having an acoustic impedance which is at least as high as the acoustic impedance of the main burner pipe for the resonant operating frequency of the latter. The analysis in terms of acoustic impedance is of value in that it takes into account permissible departures from the quarter wavelength for the intake pipe, intake pipes which join the main burner pipe at some spacing distance from the pressure anti-node where combustion is initiated, and also accounts for air intake pipes correlated with important sub- or over-tone frequencies, as well as cases in which the pipes have convergent or divergent sections, as will later be explained.

Fig. 3 is a diagram analytic of the invention in terms of acoustic impedance. In Fig. 3, at "a," numeral 60 designates a quarter wave burner pipe, and 62 designates a quarter wave air intake pipe, of lesser cross-sectional area than pipe 60. The pipes 60 and 62 are shown at "a" prior to connection, their corresponding ends being placed, for convenience, in a common plane, and both being represented with a closed end (initially assumed for purpose of acoustic analysis). To further simplify matters, the pipes are shown of equal lengths, increased length of pipe 60 required by elevated combustion gas temperature being disregarded. Curves 63 and 64 represent the magnitudes of the acoustic impedances at the operating frequency for points along the two pipes 60 and 62, respectively, considered separately, and assumed to have ends which are effectively closed, in the manner indicated at "a." The impedance curves will be seen to rise from a small magnitude near the open ends of the pipes to maximum magnitudes CD and CK at the closed ends, the curve 64 attaining a higher magnitude CK because of the smaller cross-sectional area of pipe 62.

If the two pipes 60 and 62 are now connected into one another at their adjacent ends, as at "b" in Fig. 3, the acoustic impedance of the intake pipe will be at least as high as that of the burner pipe at the junction. Comparison of the two peak impedance curve ordinates CD and CK shows, in fact, that the assumed quarter-wave pipe 62 has even greater acoustic impedance than required. It should at this point be noted that while the impedance curve 64 for the pipe 62 is based on the assumption that the pipe 62 has a closed end, the pipe 62, if open-ended and joined into communication with a region of a sound field having the same acoustic impedance magnitude CK, would retain the same acoustic impedance as represented by the curve 64. By opening it instead into the head end of pipe 60, where the impedance is CD, the acoustic impedance at the junction will be CD. But if the air intake pipe were to have a maximum acoustic impedance magnitude of less than CD, based on the closed ended assumption, it would then, when opened into head end of pipe 60, correspondingly drop the acoustic impedance at the junction below the magnitude CD, giving an undesirable condition not in conformity with the teaching of the invention.

Now, as may be seen from an inspection of Fig. 3, if the air intake pipe were to be shortened to length L, such that its acoustic impedance AB, with a closed end, is just equal to the acoustic impedance CD of pipe 62, the two pipes may be joined end to end, as in Fig. 3, at "b," and the acoustic impedance at the junction will have the desired magnitude CD. An intake pipe of length L, somewhat shorter than quarter-wave length, accordingly satisfies the combustion impedance requirements of the invention.

Finally, noting that the acoustic impedance of pipe 60 at a point X located a certain distance from its head end has a magnitude EF, somewhat less than the peak value CD at the end region, the intake pipe can be further shortened to a length L', where its acoustic impedance GH, closed-ended, is equal to EF, and the pipe of length L' may then be joined to pipe 60 at point X, as in Fig. 3 at "c," with all requirements of the invention satisfied.

In all the cases represented by Fig. 3, the intake pipe has an acoustic impedance (based on an assumed closed end, or equivalently, on connection into a sound field of at least equal acoustic impedance) at least as great as that of the burner pipe at the point of the junction for the operating frequency. This assures performance without lowering the initial acoustic impedance of the pipe 60, and therefore without dissipating the energy of the acoustic standing wave in the pipe 60.

It should be further recognized that my invention is not limited to those intake pipes of substantially one-quarter wavelength, including allowably less or greater lengths as demonstrated in the acoustic analysis given above. It may, for instance, be quite lengthy, as when dimensioned for an odd multiple of quarter wavelengths, with allowable departures therefrom as explained above; or it may be materially shortened when designed to respond in coaction with an overtone frequency. It may, in fact, be dimensioned to respond in coaction with any frequency component of interest, whether fundamental, or sub or over-tone. In this general connection, in practice, the acoustic wave pattern may be found to include both the fundamental frequency component, and a second harmonic which modifies the wave form of the fundamental. This condition may leave some vestige of sucking and blowing through the air intake pipe. For such cases, an adjustment of the air intake pipe length can be made to accommodate, or better approximate, the final complex pressure wave form in the high impedance region of the burner pipe. The wave form of the pressure cycles on opposite sides of the junction between the air intake pipe and the burner pipe can be thereby quite closely matched, virtually eliminating sucking and blowing through the air intake pipe, or at least reducing it to a completely harmless factor. All forms of my invention as described and claimed may be subject to this refinement.

It should also be noted that the analysis of the broad invention in terms of acoustic impedance is more general and powerful than that given in terms of pipes related to quarter wavelength, in that the latter analysis holds only for straight pipes, whereas the pipes may have divergent or convergent portions, converting the acoustic waves from plane fronted to spherically fronted, with the result that the pipes will be lengthened or shortened for a given wave frequency, as the case may be. The above analysis and definition in terms of acoustic impedance is sufficiently general to cover such cases.

Before passing beyond the simple embodiment of Fig. 2, it is of interest to note that the engine may be even further simplified by omitting the spark plug and carburetor. Assuming air to be blown into the scoop at the open end of the air intake port, fuel may be introduced by dripping it into or across the scoop, and ignition started by holding a lighted match inside the burner pipe. All that is required for operation, therefore, is two pipes joined end to end, provided with the acoustic impedance characteristics as explained hereinabove.

The embodiment of Fig. 4 is of the type mentioned in connection with case "c" of Fig. 3. The burner pipe 70 has closed end 71, and the intake pipe 72, curved as shown, connects into pipe 70 at a point spaced somewhat from end closure 71.

The intake end of the pipe 72 can communicate directly with carburetor 73, or supercharger 74 can be interposed. A flame arrestor is here shown as provided in pipe 72 adjacent its connection with pipe 70, consisting in this case of spaced screens 75. The air intake pipe 72 may be quarter wave pipe, or may depart from quarter wavelength, so long as it presents the necessary acoustic impedance in accordance with principles discussed earlier, particularly in connection with Fig. 3.

Pipe 70 is provided with spark plug 80, employed as already described in connection with Figs. 1 and 2. The pipe 70 is shown as equipped at its forward or closed end with an auxiliary intake check valve 81, spring loaded, which may receive air from a scoop 82. This valve opens on negative pressure half cycles occurring in the heated end region of pipe 70 to admit auxiliary air, which is useful in various ways, such as to cancel negative waves and establish asymmetric operation, and to provide for pumping of additional air through the apparatus as discussed in my aforesaid Patent 2,480,626. It will of course be understood that the supercharger 74, as well as the intake valve 41, may be used in connection with the other embodiments of the invention. The operation of the engine of Fig. 4 is otherwise similar to that described in connection with Fig. 2.

Fig. 5 shows another embodiment of the invention, similar in general essentials to that of Fig. 4, but with additional compactness attained through rearward folding of the air intake pipe. In Fig. 5, the main combustion pipe is designated by numeral 85, and comprises a forward section 86 with a forward enclosure wall 87, and a somewhat reduced tail pipe section 88. The air intake pipe 89 joins pipe 85 at a point spaced somewhat rearwardly from head end wall 87, as shown, and extends from the point of juncture in a rearward direction to a return bend at 90, to which is joined a short forwardly extending leg 91 formed with a forwardly facing air scoop 92. A spark plug is indicated at 93 and a fuel injector nozzle at 94. The head end region of pipe 85 is, as in earlier described embodiments, the location of a pressure anti-node P of a resonant standing wave set up in the pipe 85, and is accordingly a region of high acoustic impedance. Also as in earlier described embodiments, this region of high acoustic impedance coincides with the combustion chamber region of the apparatus. Further, the intake end of pipe 89 and the discharge end of tail pipe 88 are regions of low acoustic impedance, as will be understood without further explanation from what has gone before. In accordance with the principles of the invention, the air intake pipe 89 will be understood to be designed to have an acoustic impedance for the resonant operating frequency of the pipe 85 which is as high as that existing in the pipe 85 at the point of juncture of pipe 89 with pipe 85.

Fig. 5a shows a modificaiton of the engine of Fig. 5, having main combustion pipe 85a comprising forward section 86a with forward enclosure wall 87a, and reduced tail pipe section 88a. An air intake pipe 89a is provided and is like that of Fig. 5, excepting that it has no return bend and air scoop, but points rearwardly, as shown. Any suitable means, e. g., of types elsewhere described herein, can be employed to force air flow through the system. Spark plug 93a and fuel injector nozzle 94a are shown. Excepting for the rearwardly pointing pipe 89a, the engine of Fig. 5a is identical to that of Fig. 5.

Figs. 6–9 show an embodiment of the invention of great simplicity and compactness, in which the air intake duct comprises an integral part of the basic engine wall structure. A main pipe is designated generally by numeral 100, and will be seen to have a forward end closure 100a and to be open at its rearward end. A longitudinally extending portion 101 of this pipe 100 is partitioned off to serve as an air intake conduit by means of longitudinally extending partition wall 102 which extends across the pipe 100 and divides it into air intake conduit 101, and burner and combustion gas conduit 103, the former being of lesser cross sectional area than the latter, as best illustrated in Fig. 7. The partition wall 102 terminates short of head wall 100a of pipe 100, forming a combustion chamber region 105 of the full diameter of pipe 100, and a spark plug 106 and fuel injector 107 are provided, for instance, as indicated in the drawings. The partition 102 extends rearwardly out of the rearward end of pipe 100 and is then turned forwardly, as at 108, so as form a forwardly facing air scoop 109 to one side of pipe 100. As shown in the drawings, the edges of this extended and turned extension of the partition wall 102 are joined to the pipe 100 to form a closed conduit leading first rearwardly from air scoop 109, thence around a portion of the rear end of pipe 100, and thence forwardly as at 101 to feed intake air to the combustion chamber region 105.

In the operation of the embodiment of Figs. 6–9, a resonant standing wave is set up in the burner conduit 103, with a high impedance region (pressure anti-node) at P, and regions of low acoustic impedance within the air intake scoop 109 and at the discharge orifice at the rearward end of conduit 103. An interesting feature of the engine of Figs. 6–9 is that the intake and discharge ports are in such close physical proximity to one another that the regions of low acoustic impedance located at said ports merge into one another, giving a basic acoustic pattern consisting of a region of high acoustic impedance at or adjacent the combustion region, and a single general region of low acoustic impedance at the intake and discharge ports. It can thus be seen that the location of the intake port at a low impedance region, whether there may be one or more such regions, is a generic concept of the invention.

Figs. 10–14 show another compact embodiment in which the air intake duct is so much an inseparable part of the complete system including the burner conduit that its acoustic impedance is intimately determinative of the basic acoustic pattern of the system. The burner pipe portion in this case is designated generally by numeral 112, having a closed end 113 and a discharge orifice 114 at its opposite end, the tail portion 115 of the pipe being somewhat reduced, as indicated. The combustion chamber region 116 is located within the closed end portion of pipe 112, and coincides with or is adjacent a pressure anti-node P of a quarter wavelength acoustic standing wave set up in the pipe, as in earlier described embodiments. This region P, also as in earlier embodiments, is a high impedance region of the acoustic pattern, and it will be understood that the discharge orifice 114 is at a low impedance region of the acoustic pattern. The combustion chamber is fitted with spark plug 117 and fuel injector pipe 118, as indicated.

The air intake conduit, designated generally by numeral 120, is defined by a substantially half-round shell 121 fitted to the sides of pipe 112, and extending a generally longitudinal direction thereof, as shown. In the present instance, the forward end of shell 121 is located approximately even with the forward end wall 113 of pipe 112, end extends rearwardly along pipe 112 to a juncture with the latter at a point located approximately two-thirds of the length of the pipe from its head end. A port 122 in the wall of pipe 112, at a point encompassed within the shell 121, joins the rearward end of shell duct 120 with the interior of pipe 112. The forward end of shell 121 which is a low impedance region of the acoustic pattern within the duct system, forms an air scoop 123 which receives ram air during forward propulsion of the engine through the atmosphere.

In the embodiment of Figs. 10-14, the air intake conduit joins the pipe 112 at a fairly substantial distance from the high impedance region P toward the low impedance discharge region at discharge orifice 114. However, air passing through duct 120 and port 122 flows upstream of pipe 112 during the compression cycle and is thus conducted along a path of increasing acoustic impedance to the point of maximum impedance magnitude at P, and along the path of this intake air the acoustic impedances are matched at every transverse section, as earlier explained in connection with other embodiments. Here again we see that combustion is maintained at a high impedance region, and air intake at a low impedance region.

Several additional embodiments will next be disclosed, and for simplicity, these will be described more particularly with use of simple quarter wavelength terminology, it being understood, however, that all of the subsequent embodiments are capable of analysis also in terms of acoustic impedance. Throughout the discussion, therefore, it will be borne in mind that a pressure anti-node is a region of high acoustic impedance, a velocity anti-node is a region of low acoustic impedance, and that certain departures from quarter wavelength are permissible provided impedances are matched or related in accordance with the teachings of the invention.

In Figure 15 I have shown an embodiment comprising a generally cylindrical pipe 144 open at one end 145 and closed at the other end by a head 146 which is optionally equipped with air intake valves 147. Pipe 144 includes a rearward quarter-wave section and a forward half-wave section, at the junction of which is a conventional combustion means such as fuel injector 148, which may be intermittently operated in any suitable or conventional manner to inject fuel into combustion region 149, and spark plug 150. As an air intake means, pipe 144 is provided, midway between combustion region 149 and head 146, with air scoop means 151 and valveless intake ports 152.

Operation is initiated by means of spark plug 150, sufficient initial flow of air for combustion being obtained by air scooped in at 152 owing to forward velocity of the apparatus, or by air blown into the air scoop. The explosion thus accomplished creates a positive pressure pulse which travels with the velocity of sound in both directions from region 149. This wave of condensation launched toward open end 145 will be reflected back from said open end as a wave of rarefaction, while the wave of condensation launched toward head 146 will be reflected therefrom as a wave of condensation which travels back to the origin 149. It will be evident that the reflected wave of rarefaction from open end 145 will arrive at 149 just as the described wave of condensation reaches and is being reflected by closed end 146. The last mentioned wave will, however, in accordance with the laws of wave motion, be followed at a half-wave interval by a wave of rarefaction, and it will be seen that the latter is in step with the wave of rarefaction reflected from open end 145; and in like manner, the original positive pressure pulse launched toward open end 145 is followed at a half-wave interval by a wave of rarefaction, which is reflected at 145 as a wave of condensation. Moreover, at the time the wave of condensation reflected from 146 arrives at origin 149, the wave of condensation reflected from 145 arrives also at 149. A pressure peak thus reoccurs at 149, and, the fuel injector being timed to introduce a fuel charge at a given interval prior to this time, another fuel explosion occurs at 149, initiated either by the spark plug, or by residual flame. The explosion and the pressure peaks resulting from the returning waves of condensation reinforce one another, and a standing wave is established, with a pressure anti-node P at 149, another pressure anti-node P' adjacent head 146, a velocity anti-node V at 145, and a velocity anti-node V' mid-way between P and P' at air inlet ports 152. It will be seen that insofar as the conditions to the right of P in Figure 15 are concerned, the standing wave is in effect the same as though the pipe 144 were provided with a wave reflector at P, and the half-wave portion of the apparatus to the left of P hence functions as a wave reflector for the quarter-wave portion of the apparatus even though the reflecting surface is actually the surface formed by head 146.

Operation is maintained by the resonant standing wave, which is responsible for the recurrent pressure peaks at P causing cyclical combustion at the resonnant frequency. The velocity anti-node at V also results in drawing outside air into the tail of the pipe and expelling it on each cycle, adding to the mass of the discharge gases, as well as giving a desirable cooling effect. The standing wave also controls the flow of air taken in by the air intake valves 147, as well as via the ports 152. The pressure anti-node P' creates alternate periods of positive and negative pressure, during the latter of which the check valves 147 open to take in air. This air, as well as that scooped in at 151, 152, flows to the region P with a component of moderate but continous velocity, on which is superimposed a component of alternating velocity. The last mentioned component is apparently substantially zero at P, so that air is supplied to the combustion region at substantially constant velocity. The entire operation of the apparatus is thus under the control of the standing wave established therein. Propulsion is achieved by virtue of the radiation pressure thrust exerted by the standing wave on the head 146, and by the jetting of air and products of combustion from the tail.

Figures 16 and 17 show an improved embodiment of the type having a quarter-wave combustion and discharge section combined with a half-wave intake section. Numeral 160 designates generally an elongated streamlined shell, preferably of circular section, having its greatest thickness at approximately its mid-section and being slightly convergent toward its open tail end 161, and somewhat more convergent toward its open forward end or nose 162. A generally conical tube or conduit 163 is disposed within the forward half of shell 160, its side wall being annularly spaced inside and substantially parallel to shell 160. Members 160 and 163 are slightly curved in a longitudinal direction, as shown, and the rearward portion of member 163 is substantially parallel sided, while its forward end converges to a point 164 located a short distance inside the open nose of shell 160.

Conduit 163 is provided midway of its length with a circular band of air intake ports 165, outside of which are air scoop means or deflectors 166 adapted to direct through said ports the air stream entering nose 162 and travelling rearwardly in the annular duct 167. The deflectors 166 extend between the member 163 and the shell 160, and serve also as positioning and supporting means for the member 163.

Between the rearward open end 168 of member 163 and shell 160 is an annulus 169, concave on its rearwardly facing side, that serves as an additional supporting means for member 163, as a wave reflector, and also to partially define an ignition region 170. A spark plug 171 in shell 160 projects into this ignition region 170, and a curved baffle plate 172 directs a portion of the fuel-air mixture to the region 170 where it swirls about as indicated by the arrows.

A preferred fuel injection system includes a pipe 174 projecting through shell 160 and opening inside member 163 a short distance forwardly of the rearward end of the latter. A venturi tube 175, having inlet apertures 176 in its throat, is mounted in member 163 over pipe 174 so that said inlet apertures will draw fuel from the annular region 177 fed by pipe 174. The outer extremity of pipe 174 is engaged and controlled by a diaphragm valve 179 which consists of a diaphragm having a compliance at 180 and clamped at its rim between housing 181 and cover 182. Said housing 181 is mounted on and sealed to the outside of shell 160, and cover 182 encloses a chamber 183 connected by pipe 184 to the interior of shell 160 just rearwardly of member 163. A fuel pipe 185 introduces fuel, preferably gaseous, to the interior of housing 181, and its intermittent flow from there into pipe 174 is controlled by diaphragm valve 179 which is under control of pressure fluctuations transmitted to chamber 183 from a pressure anti-node region P of the resonant acoustic pattern of the system.

Air intake ports 191 are preferably formed in shell 160 near the rearward end thereof and are covered over by air scoop means 190 adapted to catch boundary layer air and deflect same in through the ports 191 to augment the mass flow from the tail and also to supply air for the acoustic oscillations at the tail, as will be referred to more fully hereinafter.

A thrust augmenter 194 is preferably used on the tail of the apparatus, and as here shown, comprises an annulus 195 which is of modified airfoil venturi contour in longitudinal section. This annulus surrounds the rearward extremity of shell 160, and is annularly spaced therefrom as shown, being mounted on the shell by means of radial supports 196. An annular baffle 197 carried by supports 196 divides the annular space between tail 161 and annulus 195 into outer and inner regions 198 and 199, respectively. It will be understood that the jet discharge from tail end 161 through annulus 195 creates a suction at the entrance to these two regions 198 and 199. Air thereby drawn into region 198 between annulus 195 and baffle 197 is added to and augments the mass of the propulsive jet directly. That air which is drawn into the inner region 199 is directed radially inward by an inwardly curved portion 200 of baffle 197, to be influenced by the air flow conditions prevailing at the velocity anti-node V located at the discharge opening in the tail. Thus, as in the earlier described embodiments, outside air is sucked into the tail during alternate negative half-cycles. The augmenter supplies substantially more air for this purpose than could be achieved without its use.

It has already been described how, in the operation of a jet propulsion apparatus of this character, air is drawn into and expelled from the open tail in step with negative and positive pressure pulses occuring thereat. With high forward velocities, however, the relative rearward velocity of the air surrounding the tail is greatly increased, and the quantity of air deflected and taken into the tail on each negative half-cycle is reduced accordingly. The apparatus thus becomes starved for lack of sufficient air on which to work, the amplitude of the oscillations falls, and a serious limitation is imposed on operation. The previously mentioned boundary layer intake means 190, 191 and the augmenter 194 and deflector 197 supply adequate air for the purposes indicated notwithstanding attenuated conditions owing to high velocity. While the boundary layer intake and the augmenter have been shown only on the embodiments of Figures 16–18, it is to be understood that they are equally applicable to all embodiments; in fact, they are not restricted in usefulness to jet propulsion apparatus having tuned intake pipes.

Operation of the apparatus of Figures 16 and 17 is in general like the embodiments already described, resembling most closely that of Figure 15. The portion of shell 160 from the rearward extremity of conduit 163 to the tail of the shell functions as a substantially quarter-wave tube having a standing wave characterized by a pressure anti-node P at the forward end of said portion and a velocity anti-node V at its open tail and the conduit 167 functions as a substantially half-wave air intake tube (modified somewhat by its convergence) joining the quarter wave shell portion at the said pressure anti-node P. A standing wave is established within conduit 163, with a pressure anti-node P' adjacent its closed pointed end, and a velocity anti-node V' opopsite air intake ports 165. The wave reflector formed by the convergent conduit 163 consists of the projected area of said tube, and the convergent form results in some displacement of the pressure and velocity anti-nodes, as compared with their position in a parallel sided tube, but they will be established substantially as shown. In connection with this embodiment, as with all these described herein, a wavelength in the heated gases in the combustion and discharge portions of the apparatus is greater than in the cooled intake portion of the apparatus. Hence, the quarter wave combustion and discharge portion of the apparatus may actually approach or even exceed the physical length of the half-wave air intake portion of the apparatus.

Ignition is initiated by means of spark plug 171, but in running, a residual flame lingers in the region 170 following each explosion and during the combustion attenuated negative pressure half-cycle of the standing wave, and is responsible for combustion at the pressure peak of each positive half-cycle thereof. During each negative half-cycle of pressure at P, the reduced pressure is communicated via pipe 184 and chamber 183 to diaphragm 179, pulling the latter down to permit fuel flow into intake pipe 174. This fuel is drawn in by the suction created in the throat of venturi tube 175, from which it is supplied to the ignition region 170 and to the general combustion region at P as indicated by the arrows. A curved baffle member 172' mounted just inside the open end of conduit 163 may be used as an alternative means for causing the fuel to swirl around into the ignition region 170. On pressure peaks at region P, positive pressure pulses are transmitted to diaphragm 179 to close the same against pipe 174 and thus interrupt fuel flow.

Attention is again drawn to the increase in cross section of the air duct at the junction of tube 163 with the rearward section of shell 160, i. e., at the locations of pressure anti-node P. For reasons already described, this embodiment will also experience a pressure increase in the region of P, and a high mean pressure; and these beneficial results are achieved in the instant embodiment to even greater advantage than in certain earlier embodiments because of better streamlining, giving a more efficient transformation from kinetic to pressure energy.

Figure 18 shows a modification of the apparatus of Figures 16 and 17. For convenience, members in Figure 18 corresponding to similar members in Figures 16 and 17 will be identified by like reference characters but with the suffix "a" added. The apparatus of Figure 18 has a conduit 163a like that of Figure 16, but the shell 160a, instead of fully enclosing the conduit 163a, begins at and joins with the conduit just rearward of its air intake ports 165a.

The fuel apertures 176a in fuel intake venturi tube 175a are controlled by reed type valves 210, tuned to a frequency higher than that of the apparatus as a whole. Annularly spaced inside the end portion of conduit 163a, and also inside venturi tube 175a, is a baffle tube 211 having at its end a flare 212 adapted to direct fuel and air flow to the ignition region 170a. The fuel admitted via the valved ports 176a travels outside the tube 211 to the region 170a, while secondary air travels through tube 211 to the combustion region 214 located at pressure anti-node P. A baffle 215 projects inwardly from shell 160a just rearwardly of region 170a, and is spaced from flare 212 so as to provide a passage for fuel mixture from region 170a to combustion region 214. A very rich mixture is thus supplied to ignition region 170a, and flows from there to combustion region 214 where it becomes leaner owing to mixture therewith of secondary air supplied through tube 211.

In operation, the spark plug 171a is again preferably used only for starting, lingering flame in region 170a, protected somewhat by baffle 215 functioning as a flame holder, accounting for subsequent combustion. A standing wave is established as in Figure 16, with pressure anti-nodes P and P' and velocity anti-nodes V and V' as in that figure. The reed valves 210 are opened and closed by and in step with the pressure variations of pressure anti-node region P. Thus the valves open to admit fuel on negative pressure half-cycles, and close to interrupt fuel flow on positive pressure half-cycles.

Figures 19 and 20 show another embodiment, generally similar to that of Figures 16 and 17, and having reference numerals similar to those used in Figures 16 and 17, but with the suffix "b" added. In this instance, additional auxiliary air intake ports 120 are placed in the convergent nose of conduit 163b, at the pressure anti-node region P', being covered by reed valves 221 tuned to a higher frequency than the frequency of the apparatus as a whole. These intake valves correspond to the valves 147 of Figure 15. At the open end of conduit 163b is a fuel-air deflector 225 consisting of an end wall 226 and peripheral, circumferentially directed, vanes 227 adapted to discharge the mixture to the ignition region 170b, with a substantial component of circular velocity so that the gases in the region 170b will spin around as indicated in Figure 20.

No fuel feed control is provided beyond the cyclically occurring suction created near the pressure anti-node region P. This suction draws in sufficient fuel on each half-cycle for the succeeding explosion, and fuel feed then ceases owing to the resulting pressure rise. The spinning action of the gases created in the region 170b holds the flame therein during the negative half-cycles of the standing wave, and the flame is hence available to cause combustion on the succeeding pressure rise. A standing wave is created in the system of Figures 19 and 20 the same as in the embodiments of Figures 15 and 16, resulting in establishment of the same pressure and velocity anti-nodes as described in connection with these figures.

The various illustrated embodiments of the invention individually incorporate numerous features which are not limited in application to the embodiment in connection with which they have been shown, but which are of universal application to all of the disclosed embodiments, as well as generally to engines in accordance with the broad invention. As one example, the embodiments of the invention shown in Figs. 1, 2, and 4–15, inclusive, can equally well utilize flame holders and baffles such as those illustrated in connection with Figs. 16 to 20. I have found in the course of my experimentation that proper application of these baffles to a specific burner configuration aids the net flow of combustion air through the system, being apparently conducive to a rectifying effect, with an accompanying degree of net pumping action.

It is of particular interest that the fuel introduction apparatus may take various forms, such as shown throughout the various illustrative embodiments, and that these are readily interchangeable. Thus one may employ fuel injection and carburetion interchangeably, and the fuel may be introduced in either case either to the air intake duct or directly to the combustion chamber. Any of these possibilities may be used with any of my engines. Engines in accordance with the invention, in fact, will readily utilize fuel introduced into the combustion chamber in any fashion, probably owing to the fact that the internal sound wave is highly effective in atomizing and mixing the fuel. It is often found convenient to introduce the fuel through a carburetor or fuel injector interposed in the air intake duct. And in those cases in which fuel injection is used, useful air inspiration results from the inflowing jet of fuel.

It will, of course, be understood that the embodiments illustrated and described herein in some detail are merely representative of the broad invention; many modifications are possible within the broad scope of the invention as defined by the appended claims.

I claim:

1. In an acoustic burner, the combination of: an acoustically resonating housing system providing a gas conduit and forming an acoustic guide for an acoustic pattern in the gas body within said housing system, which acoustic pattern has high impedance and low impedance regions; a combustion chamber in said housing system at a high impedance region of said acoustic pattern; said housing system having an air intake opening adjacent a low impedance region of a component of said acoustic pattern; and there being a combustion gas discharge opening directing a discharge of exhaust gases from said housing system; and means for supplying fuel to said housing system for combustion in said combustion chamber.

2. In an acoustic burner, the combination of: a resonating housing providing a gas conduit and forming an acoustic guide for an acoustic pattern in the gas body within said conduit, which acoustic pattern has high impedance and low impedance regions, said housing having a combustion gas discharge opening adjacent a low impedance region of said pattern; a combustion chamber in said housing at a high impedance region of said acoustic pattern; a conduit supplying air to said combustion chamber and having at its junction with said housing an acoustic impedance which is substantially as high as that of the housing at said junction; and means for supplying fuel to said housing for combustion in said combustion chamber.

3. In an acoustic burner, the combination of: a housing system providing a gas conduit and forming an acoustic guide for an acoustic pattern in the gas body within said housing system, which acoustic pattern has high impedance and low impedance regions, a combustion chamber in said housing system at a high impedance region of said acoustic pattern, said housing system being ported for low-impedance-region air intake to and combustion gas discharge from said gas conduit, and means for supplying fuel to said housing system for combustion in said combustion chamber.

4. Apparatus of the character described which includes: a resonant fluid housing forming an acoustic cavity for a standing wave and a conduit for a fluid stream, a fluid discharge opening leading from said conduit, said cavity when acoustically excited forming a guide for a standing wave, having a velocity anti-node adjacent said fluid discharge opening and a pressure anti-node region upstream of said conduit from said velocity anti-node, a continuously open air intake conduit opening into said housing at a junction point in the general region of said pressure anti-node, and means for supplying fuel to form a combustible mixture with said air for periodic combustion in said pressure anti-node region to excite said standing wave, said air intake conduit having at its junction with said housing an acoustic impedance for the frequency of the standing wave in said resonant housing which is substantially as high as the acoustic impedance of the resonant housing at said point of junction for said frequency.

5. In a jet propulsion apparatus, the combination of: a resonant sonic column means adapted to have a standing wave established therein and comprising a tube closed at one end to provide a pressure anti-node of said standing wave thereadjacent and having an opening at the far extremity to provide a velocity anti-node of said standing wave thereadjacent, there being a combustion zone at said closed end, said tube containing combustion products forming a fluid column, means for admitting a combustible charge to said combustion zone and for exploding same therein at the frequency of said standing wave so as to resonate said fluid column, said last mentioned means embodying an air induction pipe opening on said combustion zone and of a length corresponding substantially to one-quarter of the wavelength of the wave pattern in said fluid column whereby said air induction pipe resonates with said fluid column and whereby the end of said air induction pipe farthest removed from said combustion zone represents a zone of minimum pressure variation.

6. In an apparatus of the character described, the combination of: a resonant sonic column means adapted to have a standing wave established therein and comprising a pipe closed at one end to provide a pressure anti-node of said standing wave there-adjacent and having an opening at the far extremity to provide a velocity anti-node of said standing wave there-adjacent, there being a combustion zone at said closed end, said pipe containing combustion products comprising a fluid column; means for successively forming a combustible charge in said combustion zone and for exploding same therein at the frequency of said standing wave so as to resonate said fluid column, said last-mentioned means including periodic fuel feeding means and a continuously open air induction pipe opening on said combustion zone and of a length corresponding substantially to one quarter wavelength of the resonant frequency of the wave pattern in said fluid column whereby said air induction pipe resonates with said fluid column and whereby the end of said air induction pipe farthest removed from said combustion zone represents a zone of minimum pressure variation.

7. A standing wave burner apparatus which includes a main tubular resonant fluid conduit and acoustic standing wave guide having a fluid discharge opening at one end and a wave-reflecting closure at the other end, said fluid discharge opening and said wave-reflecting closure fixing a velocity anti-node of the standing wave in said conduit at said discharge opening and a pressure anti-node adjacent said closure, thermal drive means including fuel delivering means for supplying fuel to said pressure anti-node region to cause intermittent combustion at resonant frequency within said pressure anti-node region, and a continuously open fluid intake conduit having an end thereof opening into said first-mentioned conduit in the region of said pressure anti-node, said intake conduit having a length sufficiently approximating a quarter wave length for the resonant frequency of the main fluid conduit to be acoustically tuned and correlated with the resonant frequency of said main conduit for the establishment of a standing wave in the intake conduit which is in phase with the standing wave in the main fluid conduit and is characterized by the location of a velocity anti-node at the intake end of the air intake conduit, and a pressure anti-node at the junction of the air intake conduit with the pressure anti-node region of said main conduit, thereby providing a discharge of air from said intake conduit into said main conduit, and providing also an acoustic impedance for the discharge passage between the intake conduit and the main conduit which is substantially as high as that of the main conduit at the point of junction, whereby to prevent dissipation of pressure anti-node wave energy from the main conduit into the intake conduit through said passage.

8. A standing wave burner apparatus which includes a main tubular resonant fluid conduit and acoustic standing wave guide having a fluid discharge opening at one end and a wave-reflecting closure at the other end, said fluid discharge opening and said wave-reflecting closure fixing a velocity anti-node of the standing wave in said conduit at said discharge opening and a pressure anti-node adjacent said closure, thermal drive means including fuel delivering means for supplying fuel to said pressure anti-node region to cause intermittent combustion at resonant frequency within said pressure anti-node region, and a continuously open fluid intake conduit of lesser effective cross-section than the main conduit having an end thereof opening into said first-mentioned conduit through said closure, said intake conduit having a length sufficiently approximating a quarter wavelength for the resonant frequency of the main fluid conduit to be acoustically tuned and correlated with the resonant frequency of said main conduit for the establishment of a standing wave in the intake conduit which is in phase with the standing wave in the main fluid conduit and is characterized by the location of a velocity anti-node at the intake end of the air intake conduit, and a pressure anti-node at the junction of the air intake conduit with the pressure anti-node region of said main conduit, thereby providing a discharge of air from said intake conduit into said main conduit, and providing also an acoustic impedance for the discharge passage between the intake conduit and the main conduit which is substantially as high as that of the main conduit at the point of junction, whereby to prevent dissipation of pressure anti-node wave energy from the main conduit into the intake conduit through said passage.

9. A standing wave burner apparatus which includes a main tubular resonant fluid conduit and acoustic standing wave guide having a fluid discharge opening at one end and a wave-reflecting closure at the other end, said fluid discharge opening and said wave-reflecting closure fixing a velocity anti-node of the standing wave in said conduit at said discharge opening and a pressure anti-node adjacent said closure, thermal drive means including fuel delivering means for supplying fuel to said pressure anti-node region to cause intermittent combustion at resonant frequency within said pressure anti-node region, and a continuously open fluid intake conduit having an end thereof opening into said first-mentioned conduit through said closure, said intake conduit having a length sufficiently approximating an odd multiple of quarter wavelengths for the resonant frequency of the main fluid conduit to be acoustically tuned and correlated with the resonant frequency of said main conduit for the establishment of a standing wave in the intake conduit which is in phase with the standing wave in the main fluid conduit and is characterized by the location of a velocity anti-node at the intake end of the air intake conduit, and a pressure anti-node at the junction of the air intake conduit with the pressure anti-node region of said main conduit, thereby providing a discharge of air from said intake conduit into said main conduit, and providing also an acoustic impedance for the discharge passage between the intake conduit and the main conduit which is substantially as high as that of the main conduit at the point of junction, whereby to prevent dissipation of pressure anti-node wave energy from the main conduit into the intake conduit through said passage.

10. An acoustic jet engine which includes: a resonant acoustic standing wave cavity having a jet discharge opening, said cavity having a velocity anti-node and a pressure anti-node region therein, fuel introduction means discharging to said pressure anti-node region for maintaining periodic combustion to provide periodic pressure pulses for wave generation at said pressure anti-node at a resonant frequency of said cavity, and air introduction means consisting of a continuously open intake pipe of substantially quarter wave length for the resonant frequency of the cavity connected to said cavity at said pressure anti-node.

11. An acoustic jet engine which includes: a resonant acoustic standing wave cavity having a jet discharge opening, said cavity having a velocity anti-node and a pressure anti-node region therein, fuel introduction means discharging to said pressure anti-node region for maintaining periodic combustion to provide periodic pressure pulses for wave generation at said pressure anti-node at a resonant frequency of said cavity, and air introduction means consisting of an intake pipe of a length equal substantially to a multiple of quarter wavelengths for the resonant frequency of the cavity connected to said cavity at said pressure anti-node, said intake pipe having a continuously open intake opening located substantially an odd number of quarter wavelengths, including unity, from said pressure anti-node.

12. Apparatus of the character described which comprises the combination of: a housing providing a resonant fluid conduit, said housing having rigid wave-reflecting walls for guiding a standing wave in the fluid column in said resonant conduit, and a fluid discharge opening at one end of said conduit functioning to locate a velocity anti-node of the standing wave thereadjacent, said conduit having a length and resonant wave frequency providing at least two pressure anti-nodes and an intervening velocity anti-node located upstream from said velocity anti-node at said discharge opening, said housing also having a combustion chamber located in said conduit in the region of a pressure anti-node of said standing wave, means for feeding fuel to said combustion chamber, and a continuously open intake for combustion supporting fluid opening into said conduit substantially at a velocity anti-node of said standing wave located upstream of said combustion chamber, the portion of said conduit between said fluid intake and said combustion chamber forming a flow path for the combustion supporting fluid, all in such manner that periodic combustion will occur in said combustion chamber at a resonant frequency of said conduit to generate pressure pulses which create and sustain said standing wave, and so that the combustion supporting fluid is introduced to the conduit through the continuously open air intake without loss of pressure anti-node wave energy from said combustion chamber.

13. A standing wave burner apparatus which includes: a tubular resonant fluid conduit and acoustic wave guide closed at one end and having a fluid discharge opening at the other, said conduit being adapted for thermal fluid wave excitation at a resonant frequency of the conduit establishing a three-quarter wavelength standing wave having a velocity anti-node at the discharge end of the conduit, a pressure anti-node one-quarter wavelength back from said opening, another velocity anti-node a half-wavelength back from said opening, and another pressure anti-node adjacent said closed end of said conduit, a fuel combustion zone at said first mentioned pressure anti-node, means for introducing fuel to said combustion zone, and a continuously open air intake opening into the conduit in the region of the second mentioned velocity anti-node.

14. A combination as defined in claim 13, including auxiliary pressure operated air intake means at the pressure anti-node region of said closed end of said conduit.

15. A jet propulsion apparatus which includes: a tubular housing open for air intake and air discharge at its forward and rearward ends, respectively, an inner fluid conduit annularly spaced within the forward portion of said housing and having a closed forward end adjacent the open forward end of the housing, there being a continuously open air intake into said conduit substantially midway of the length thereof, and the rearward end of said conduit being open and discharging into a larger cross-sectional mid-portion of said housing, whereby to form an enlarging offset in the fluid path through the apparatus providing a relatively protected outer combustion zone of reduced velocity and increased pressure wherein flame may be retained throughout the standing wave cycle, wall means closing the annular space between said open conduit end and said housing, said housing from said wall means to its said open end adapted to be excited by intermittent combustion occurring therein at a resonant frequency of said housing to establish a standing wave therein with a velocity anti-node at its open end and a pressure anti-node adjacent said wall means, means for delivering fuel to the pressure anti-node region of said housing, and said fluid conduit being of a length such that a standing wave is established therein when said housing is so excited, with a pressure anti-node in coincidence with said pressure anti-node of said housing, a velocity anti-node substantially midway of its length, and another pressure anti-node nearer its closed end.

16. A combination as defined in claim 15, including fuel metering means controlled by fluid pressure fluctuations at a pressure anti-node.

17. A combination as defined in claim 15, wherein said tubular housing is of streamlined contour, with its greatest thickness at approximately its mid-portion, and being convergent toward its forward and rearward ends, and wherein said conduit has side walls convergent toward the forward end thereof, and functioning together with the housing walls outside thereof to define an annular air passage leading from the forward open end of the housing to the air intake in the conduit.

18. A jet propulsion apparatus including: a resonant substantially quarter-wave combustion and discharge pipe having closed and open ends adapted to be excited to resonance, with the establishment of a velocity anti-node at said open end and a pressure anti-node at said closed end, said pressure anti-node region forming a combustion zone, means for delivering fuel to said combustion zone, an air intake conduit of lesser cross-section than said pipe having one end thereof closed, a continuously open air intake in its mid-portion, and the other end thereof opening concentrically through the closed end of said combustion and discharge pipe into said combustion zone, whereby to form an enlarging offset in the fluid path through the apparatus providing a relatively protected outer combustion region wherein flame may be retained throughout the standing wave cycle, said conduit being of a length acoustically correlated with the resonant frequency of the quarter wave combustion pipe for the establishment of a substantially quarter wave standing wave therein when said pipe is excited to resonance, with a pressure anti-node in coincidence with said pressure anti-node of said housing, a velocity anti-node at the location of said air intake, and a pressure anti-node nearer its closed end.

References Cited in the file of this patent

UNITED STATES PATENTS

| | | |
|---|---|---|
| 1,834,473 | Ricardo | Dec. 1, 1931 |
| 2,041,081 | Menzies | May 19, 1936 |
| 2,062,013 | Opolo | Nov. 24, 1936 |

FOREIGN PATENTS

| | | |
|---|---|---|
| 27,724 | Great Britain | Dec. 16, 1907 |
| 147,026 | Great Britain | Oct. 6, 1921 |
| 176,026 | Great Britain | Mar. 6, 1922 |
| 188,642 | Great Britain | Nov. 29, 1923 |
| 424,955 | Great Britain | Dec. 1, 1933 |
| 412,478 | France | May 3, 1910 |
| 549,389 | France | Nov. 18, 1922 |
| 1,657 | Netherlands | Nov. 1, 1916 |